(No Model.)
F. H. FISK.
ICE CREAM FREEZER.
No. 525,340.  Patented Sept. 4, 1894.
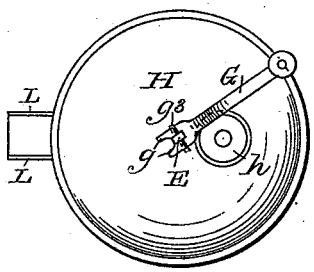
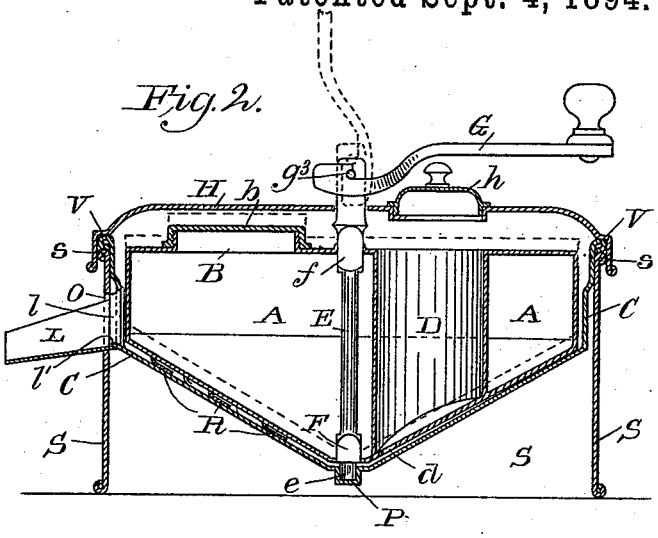
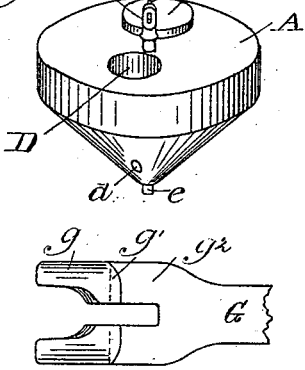
Witnesses:
John W. Fisher
Grace T. Many
Inventor:
Frank H. Fisk.
by Ward & Cameron
Attorneys

UNITED STATES PATENT OFFICE.

FRANK H. FISK, OF ALBANY, NEW YORK.

ICE-CREAM FREEZER.

SPECIFICATION forming part of Letters Patent No. 525,340, dated September 4, 1894.

Application filed May 4, 1894. Serial No. 510,059. (No model.)

*To all whom it may concern:*

Be it known that I, FRANK H. FISK, a citizen of the United States, residing in the city and county of Albany, State of New York, have invented a new and useful Improvement in Ice-Cream Machines, of which the following is a specification.

My invention relates to improvements in mechanism for manufacturing ice cream and ices; and the object of my invention is to provide a new and useful machine by means of which ice cream and ices may be made rapidly and successfully. I attain this object by means of the mechanism illustrated in the accompanying drawings, in which—

Figure 1 is a plan. Fig. 2 is a vertical section. Fig. 3 is a perspective view of the ice cylinder. Fig. 4 is a plan of the bottom of the cream cylinder. Fig. 5 is a detail view showing the method of securing a scraper to the cylinder, and Fig. 6 is a detail view showing the lips projecting from the cream cylinder into the discharge orifice. Fig. 7 is a view of the end of the crank arm G.

Similar letters refer to similar parts throughout the several views.

Within the shell S, which is open at the top and bottom, usually cylindrical in form and provided with an orifice O in the side, to which I usually attach the outwardly projecting lips L, I place the cream cylinder C supported by a projecting and overlapping rim V at its upper edge, which rests upon the upper edge $s$ of the shell S.

For the purpose of preventing the revolution of the cream cylinder, I construct thereon the lips $l$ $l$ in the orifice T which enter the orifice O in the shell S resting against the sides of the lips L L. I also construct at the orifice T on the side of the cream cylinder C, a projection $l'$, which extends into the orifice O resting upon the horizontal portion of the opening in the shell at O and tends to assist in supporting the cream cylinder C. The bottom of the cream cylinder is formed in the shape of a cone inverted, having at its lowest extremity a step-bearing P sunk in the inverted apex.

On the bottom of the cream cylinder C and extending from the apex to the side of the cylinder, I arrange a series of scrapers R R, which are usually placed parallel to each other, but diagonally to the sides of the cylinder.

The scrapers R may be secured by means of rivets $r$ passing through them and through the bottom of the cylinder, as shown in Fig. 5, or in any suitable manner. The scrapers R are provided at their upper edge with an outwardly projecting flange. One of the scrapers is arranged with its upper end in contact with one of the vertical sides of the orifice T registering with the orifice O in the shell.

The cream cylinder is constructed of one piece of metal stamped in the form described, having its upper edges turned to provide the overlapping rim V.

Within the cream cylinder C, I place the ice cylinder A, which is provided with an inverted cone shaped bottom co-inciding with the cone shaped bottom of the cream cylinder.

Near the apex of the cone shaped bottom of ice cylinder, is a small opening $d$ communicating with the cream conduit D, which extends through the ice cylinder A. Passing through the center of the ice cylinder and extending through the apex thereof, I place a spindle E provided at its lower extremity with a rounded projection $e$, which enters the step-bearing P in the bottom of the cream cylinder C. The shoulder F on the spindle E fits into the ice cylinder holding the spindle firmly in position at the apex of the bottom. That portion of the spindle E which passes through the top of the ice cylinder, is squared at $f$ preventing the movement of the spindle in the ice cylinder.

To the end of the spindle extending above the cover, I arrange a crank arm G in any suitable manner.

I place a cover H over the shell S, which is provided with a smaller cover $h$ over an opening through which cream may be passed into the cream conduit D without removing the large cover H.

The operation of my machine is as follows: The cream cylinder having been placed in position in the shell, ice is put into the ice cylinder through the opening B and the cover $b$ is put thereon, usually fastened by screwing the same to projecting lips, as shown in Fig. 2. Cream is poured into the cream conduit D, from which it passes into the cream cylinder near the inverted apex thereof, through hole $d$ and the ice cylinder is caused to revolve by operating the crank arm G. The cream is kept constantly in contact with the cold surface of the exterior of the ice cylinder and as it hardens, is forced upward coming into contact with the scrapers R R and passes out at the orifice O, where it is gathered from the lips L of said orifice.

In order to prevent the ice cylinder and the cream cylinder from freezing together when the revolution of the ice cylinder is stopped, I arrange a means for raising the ice cylinder from contact with the cream cylinder, which is done by providing the crank arm G in the manner shown in Fig. 7, which is having a bifurcated end $g$ provided with a shoulder $g'$; the part of the arm G adjacent to the shoulder is cut away at $g^2$ allowing the pin $g^3$ to fit against the shoulder $g'$, when the spindle E is placed within the bifurcated end of the crank arm. The distance from the pin $g^3$ to the end of the crank arm is greater than the distance from the pin $g^3$ to the cover H. Therefore, when the crank arm G is placed in a vertical position, as shown by dotted lines in Fig. 2, the end of the crank arm will come into contact with the cover H and cause the spindle E to be raised—thus raising the ice cylinder from contact with the cream cylinder, which it is very necessary to do in order to prevent freezing. When these cylinders freeze together, it is impossible to move the ice cylinder without first thawing it out—causing great delay and damage to the machine.

I am aware that a patent has been issued to Thomas B. Garretson and Walter R. Thatcher, No. 462,696, dated November 10, 1891, which describes a similar apparatus for manufacturing ice cream and ices, and it is for the purpose of obtaining a patent for improvements which I have made in the manufacture of the machine described by said Letters Patent, which said Letters Patent are owned by myself and others, that I make this application. The invention as described by said Letters Patent is improved upon by my invention in many respects, one of which is providing a shell which is open at the top and bottom and the means for supporting the cream cylinder from the top of said shell, instead of having it rest within a casing provided with a false bottom, as was shown and described in said Letters Patent. A cold air space is formed about the cream cylinder. Another improvement, is that of providing the spindle E passing through the ice cylinder and having at its end, a bearing in the bottom of the cream cylinder, thus making a positive and rigid axis, upon which the ice cylinder revolves. The method of securing the spindle to the ice cylinder by means of the squared portion $f$ at the top and the shoulder F at the bottom operates to prevent any possibility of the spindles revolving within the cylinder. By providing the projecting lips $l\ l$ in the discharge orifice T of the cream cylinder C, I prevent any possibility of the rotation of said cylinder.

I construct the cream cylinder of one piece of metal, and also the ice cylinder, except the top thereof, so that there can be no friction or interference of parts, occasioned by the welding of adjacent sides in their construction.

What I claim as my invention, and desire to secure by Letters Patent, is—

1. In a machine for manufacturing ice cream and similar products, the combination of a shell open at the top and bottom, a cream cylinder provided with an overlapping upper edge adapted to rest upon the upper edge of said shell, a cold-air space between said shell and said cylinder, an ice cylinder placed within said cream cylinder, a spindle passing through said ice cylinder and having a bearing within said cream cylinder, said spindle provided with a shoulder at its lowest extremity and squared to prevent oscillation within said ice cylinder, a conduit in said ice cylinder communicating with the bottom of said cream cylinder, a discharge orifice in said cream cylinder registering with a discharge orifice in said shell, substantially as described and for the purpose set forth.

2. In a machine for manufacturing ice cream and similar products, a cream cylinder suitably supported at its upper edge, the bottom of said cream cylinder in the form of an inverted cone, an orifice in the side of said cream cylinder, outwardly projecting lips connected with the sides of said orifice, an orifice in the side of said shell into which said projecting lips of the orifice in the cream cylinder pass, an ice cylinder constructed to coincide in form with the interior of said cream cylinder, a spindle passing through the center of said ice cylinder having its end resting in the step-bearing in the apex of the cream cylinder, a cream conduit passing through said ice cylinder, an opening in said ice cylinder for placing ice therein, a means for revolving said ice cylinder within said cream cylinder, substantially as described and for the purpose set forth.

3. In a machine for manufacturing ice cream and similar products, the combination of a shell open at the top and bottom, a cream cylinder provided with an overlapping upper edge adapted to support said cream cylinder in said shell, an ice cylinder placed within said cream cylinder, a spindle passing through said ice cylinder and having a step-bearing within said cream cylinder, a conduit in said ice cylinder communicating with the bottom of said cream cylinder, a discharge orifice in said cream cylinder registering with a discharge orifice in said shell, a means for raising the ice cylinder from contact with the cream cylinder by the operation of a crank arm, substantially as described and for the purpose set forth.

4. In a machine for manufacturing ice cream and similar products, the combination of a shell open at the top and bottom, a cream cylinder secured therein, an ice cylinder capable of revolution in said cream cylinder, a spindle passing through said ice cylinder and having a bearing in said cream cylinder, a crank arm provided with a bifurcated end, a pin through said spindle near the end thereof, an overlapping shoulder near the end of said crank arm, so arranged that the crank arm may be placed on said spindle, said pin resting against said overlapping shoulder so constructed that when the crank arm is raised to a vertical position said spindle and ice cylinder will be raised from contact with the cream cylinder, substantially as described and for the purpose set forth.

FRANK H. FISK.

Witnesses:
    FREDERICK W. CAMERON,
    GRACE T. MANY.